United States Patent [19]
Armstrong et al.

[11] Patent Number: 5,968,660
[45] Date of Patent: Oct. 19, 1999

[54] COATED SUBSTRATE

[75] Inventors: Stephen Armstrong, Braine L'Alleud; Andre Detrembleur, Chenee, both of Belgium

[73] Assignee: Dow Corning S.A., Seneffe, Belgium

[21] Appl. No.: 09/012,787

[22] Filed: Jan. 23, 1998

Related U.S. Application Data

[62] Division of application No. 08/753,235, Nov. 22, 1996, Pat. No. 5,741,439, which is a continuation of application No. 08/292,306, Aug. 18, 1994, abandoned.

[30] Foreign Application Priority Data

Aug. 27, 1993 [GB] United Kingdom .................. 9317813

[51] Int. Cl.[6] ...................................... B32B 9/04
[52] U.S. Cl. ........................ 428/447; 427/387; 427/391
[58] Field of Search ............................ 428/447; 427/387, 427/391; 252/312; 528/15, 31, 32; 524/862, 837; 516/55, 53, 73

[56] References Cited

U.S. PATENT DOCUMENTS

| | | | |
|---|---|---|---|
| 3,284,406 | 11/1966 | Nelson | 528/15 |
| 3,436,366 | 4/1969 | Modic | 528/15 |
| 4,190,688 | 2/1980 | Traver et al. | 427/391 |
| 4,433,007 | 2/1984 | Marwitz et al. | 524/862 |
| 4,526,953 | 7/1985 | Dallavia, Jr. | 528/15 |
| 4,537,829 | 8/1985 | Blizzard et al. | 428/429 |
| 4,791,029 | 12/1988 | Fau et al. | 428/447 |
| 4,830,924 | 5/1989 | Dallavia, Jr. | 528/15 |
| 4,954,554 | 9/1990 | Bunge | 528/388 |
| 5,028,653 | 7/1991 | Desmonceau et al. | 524/462 |
| 5,104,927 | 4/1992 | Hara et al. | 524/731 |
| 5,169,919 | 12/1992 | Terae et al. | 528/15 |
| 5,171,638 | 12/1992 | Ozaki et al. | 524/837 |
| 5,401,810 | 3/1995 | Naganawa et al. | 524/837 |
| 5,446,087 | 8/1995 | Chizat et al. | 524/588 |
| 5,468,828 | 11/1995 | Hurford et al. | 528/15 |
| 5,696,211 | 12/1997 | Chung et al. | 528/15 |
| 5,741,439 | 4/1998 | Armstrong et al. | 252/312 |
| 5,753,346 | 5/1998 | Leir et al. | 428/447 |
| 5,795,947 | 8/1998 | Frances et al. | 528/15 |

FOREIGN PATENT DOCUMENTS 0 108 208   5/1984   European Pat. Off. .

*Primary Examiner*—Richard D. Lovering
*Assistant Examiner*—Daniel S. Metzmaier
*Attorney, Agent, or Firm*—Timothy J. Troy

[57] ABSTRACT

This invention relates to a coated substrate obtained by a method comprising (I) applying a silicone emulsion composition to the surface of a substrate wherein the silicone emulsion composition comprises (a) an alkenylated silicone resin, (b) an alkenyl polydiorganosiloxane, (c) a silicone resin having SiH groups, (d) water, (e) a polyorganohydrogensiloxane, (f) an unsaturated organic monomer, (g) a hydrosilylation catalyst, and (h) an emulsifying agent. Separation of a laminate formed from a substrate coated with said emulsion release coating composition and a adhesive coated article requires a relatively high delamination force.

17 Claims, No Drawings

COATED SUBSTRATE

CROSS-REFERENCE TO RELATED APPLICATIONS

This is a divisional of Ser. No. 08/753,235, filed Nov. 22, 1996, U.S. Pat. No. 5,741,439, which is a continuation of Ser. No. 08/292,306, filed Aug. 18, 1994, abandoned.

The invention relates to silicone emulsion compositions. In particular the invention relates to silicone emulsion compositions which can be used in or as release coating compositions.

Silicone emulsion compositions, e.g. those which are curable by a hydrosilylation reaction are used as release coatings on substrates, for example paper and the like, for the purpose of preventing adhesion which may occur between laminates of coated substrates and adhesive coated articles.

A release coating which allows a coated substrate to separate from an adhesive coated article with the application of only a small force, i.e. a release coating which exhibits a low release force, is referred to in the art as a premium release coating.

For many applications in the paper coating industry and in particular in the field of laminates, wherein adhesive coated articles, e.g. sticky labels and the like, are laminated with coated substrates, e.g. siliconised backing paper, higher release forces are required than those obtainable from premium release coatings. Accordingly, additives have been developed which increase the release force of such coatings. The release force increasing additives are often referred to in the art as controlled release additives.

Controlled release additives known in the art comprise vinylated silicone resins and are generally effective at increasing the release force of premium release coatings. However, the release force of release coatings containing such additives tend to be unpredictable and fluctuate unreliably depending on the speed at which a coated substrate is peeled or delaminated from an adhesive material.

For applications in the paper coating industry and in particular in the field of laminates, it is desirable that the release force of a release coating should be predictable over a range of delamination speeds. Further, the release force should be sufficiently low to allow ease of delamination, but not so low as to allow accidental delamination, for example during storage or handling.

Additionally, the adhesive coated article, once delaminated from a coated substrate, should retain its adhesive properties.

It is one of the objects of the present invention to provide an improved emulsion composition for use in providing release coating compositions.

The invention provides in one of its aspects an emulsion composition comprising (a) an alkenylated silicone resin, (b) an alkenyl polydiorganosiloxane, (c) a silicone resin bearing SiH groups and (d) water.

An emulsion composition according to the invention comprises (a) an alkenylated silicone resin which preferably is an MQ resin i.e. a resin consisting of monovalent siloxane units M and quadrivalent siloxane units Q and is preferably a resin consisting essentially of M units $R'R_2SiO_{1/2}$ and $R_3SiO_{1/2}$ and Q units $SiO_{4/2}$ in which R denotes an alkyl or aryl group having 1 to 8 carbon atoms, preferably a methyl group and R' denotes an alkenyl group having from 1 to 8 carbon atoms for example vinyl, allyl, hexenyl or cyclohexenyl. Preferably R' is a vinyl group, there being at least 1.5% by weight of vinyl groups per molecule. Preferably the number ratio of M units to Q units is in the range of 0.4:1 to 1.7:1 and is more preferably in the range of 0.6:1 to 1.5:1. The resin may be in solid or liquid form but we prefer that the M:Q ratio is chosen in order that the resin is a solid at ambient temperature e.g. 22° C.

Preferably the alkenylated silicone resin is provided as a 60% solution in xylene, the solution having a viscosity of 5 to 15 mPa·s and preferably 8 to 13 mPa·s at 25° C.

An emulsion composition according to the invention comprises (b) an alkenyl polydiorganosiloxane having silicon-bonded unsaturated groups. This alkenyl polydiorganosiloxane consists essentially of siloxane units according to the general formulae $R_aR'SiO_{(3-a)/2}$ and $R_bSiO_{(4-b)/2}$ R and R' are as referred to above, a is 1 or 2, and b is 2 or 3. Preferably R' is a vinyl or hexenyl group. Preferred alkenyl polydiorganosiloxanes have from 0.1% to 3.0% by weight of aliphatic unsaturated groups per molecule and viscosities of the order of about 20 to about 12000 mPa·s at 25° C. Preferred component (b) is a polydiorganosiloxane consisting of $Me_2SiO$ units and terminal units $ViMe_2SiO_{1/2}$ and having a viscosity of from bout 7000 mPa·s to about 12000 mPa·s at 25° C. (wherein Me denotes a methyl group and Vi denotes a vinyl group). Preferably component (b) may be present in an emulsion composition according to the invention in proportions of up to 12.5 parts by weight and preferably 6.0 to 8.0 arts by weight per 100 parts of component (a).

An emulsion composition according to the invention comprises (c) a silicone resin bearing SiH groups. Preferably the SiH groups are present in polyorganohydrogensiloxy groups by which is meant a monovalent residue of a polyorganohydrogensiloxane. This resin may be an MQ resin having M units which include $R_3SiO_{1/2}$ and $R_2R'''SiO_{1/2}$ and Q units $SiO_{4/2}$ where R is as aforesaid and R''' represents a H-atom or an aforementioned polyorganohydrogensiloxy group. The resin (c) may also comprise units bearing a hydroxyl group. The preferred silicone resin (c) has from 0.6 to 1.0 wt % of H-atoms bonded to silicon. The preferred resin (c) is the reaction product of a hydroxyl bearing organosilicon resin (i) and a polyorganohydrogensiloxane (ii). Preferred organosilicon resin (i) comprise units of the formula $R_3SiO_{1/2}$ and $SiO_{4/2}$ wherein R is as hereinbefore defined. Resin (i) preferably contains from about 0.1% to about 5% by weight of silicon-bonded hydroxyl groups. Polyorganohydrogensiloxanes (ii) useful as reactants in the formation of resin (c) comprise units according to the general formula $R_cHSiO_{(3-c)/2}$ in which R is as referred to above and c is 1 or 2. The polyorganohydrogensiloxane may also comprise units $R_bSiO_{(4-b)/2}$ in which R and b are as referred to above. Preferably, the polyorganohydrogensiloxane (ii) has from 0.3 to 1.6% by weight of silicon-bonded hydrogen atoms per molecule. We prefer that each R is a methyl group. Preferably, where terminal groups are present in the polyorganohydrogensiloxane (ii), they have the formula $(CH_3)_3SiO_{1/2}$. A suitable polyorganohydrogensiloxane comprises MeHSiO groups with or without the presence of $Me_2SiO$ groups (where Me denotes a methyl group) and are liquids having a viscosity of the order of from about 6 to about 150 mpa·s and more preferably from about 60 to about 110 mPa·s at 25° C.

The preferred resin (c) may be formed by dispersing resin (i) in an organic solvent and thoroughly mixing with a polyorganohydrogensiloxane (ii) and an acid, preferably a strong acid such as HCl, and heating the mixture to 150° C. to volatilize and remove substantially all of the organic solvent from the mixture. Said heating of the mixture is initially at atmospheric pressure and may be continued at reduced pressure to aid removal of the solvent. This reaction process is described and claimed in U.S. Pat. No. 4,537,829.

Silicone resin (c) may be present in an emulsion composition according to the invention in proportions of up to 31.0 parts by weight and preferably 0.5 to 10.6 parts per 100 parts of component (a).

Emulsion compositions according to the invention may additionally comprise (e) a linear or cyclic polyorganohydrogensiloxane. The component (e) may be a polyorganohydrogensiloxane as referred to above. Preferred polyorganohydrogensiloxanes (e) may be those preferred polyorganohydrogensiloxanes referred to above. The linear or cyclic polyorganohydrogensiloxane (e) may be present in an emulsion composition in proportions of from 0 to 25 parts by weight and is preferably present in amounts of from 10 to 18 parts by weight per 100 parts of component (a).

An emulsion composition according to the invention may comprise a component which is a non-volatile diluent which may be used as an aid to dispersing the alkenylated silicone resin (a). Said diluent may be selected from the unsaturated organic monomers dibutylmaleate, decylvinyl ether, dodecylvinylether, camphene, meta-bis-isopropenyl benzene and $C_{16-18}$ α-olefins. A preferred material is the α-olefin, 1-octadecene. The preferred diluent may be present in an emulsion composition according to the invention in proportions of from 30 to 50 parts by weight and preferably 39 to 41 parts per 100 parts of component (a).

An emulsion composition according to the invention preferably comprises an anionic, cationic or non-ionic emulsifying agent. We prefer to employ a non-ionic emulsifying agent, most preferably a polyvinyl acetate. The preferred polyvinyl acetate is not less than 92% hydrolysed and not more than 98% hydrolysed, e.g. 96% hydrolysed.

An emulsion composition according to the invention may comprise additional additives, for example, 0.1 to 0.6 part per 100 parts by weight of (a) of a bath life extender in order to minimize any premature reaction within the droplets of a catalysed emulsion composition which would reduce the ability of the emulsion composition to form a film on a substrate, a biocide and 0.16 to 0.24 parts per 100 parts of (a) of acetic acid.

Production of an emulsion composition according to the invention can be accomplished by emulsifying components (a), (b), (c), optionally component (e) and other excipients in water with an emulsifying agent. The emulsification can be achieved in a number of ways and the order of mixing of the components is not critical. A preferred method is to mix components (a), (b), (c), (e) and other excipients before adding water and an emulsifying agent to provide a crude emulsion. The crude emulsion may then be mixed using any of the known homogenizer machines to form an emulsion having the desired particle size and distribution. The emulsion thus formed may be adjusted to the desired active solids (i.e. the total silicone solids and non-volatile diluent e.g. $c_{16-18}$ α-olefin) content by adding the necessary amounts of water. Emulsion compositions according to the invention may be provided as 30 to 50% active solids and preferably 38 to 42% active solids emulsions.

An emulsion composition according to the invention may be caused to cure via a hydrosilylation reaction in the presence of a hydrosilylation catalyst for example a rhodium or platinum containing material. Platinum catalysts may take any of the known forms, a preferred form of platinum being chloroplatinic acid either as the commonly obtainable hexahydrate or the anhydrous form, on account of its easy dispersibility in the organosilicon system and its non-effect on the colour of the mixture. Platinum complexes may also be used e.g. those prepared from chloroplatinic acid hexahydrate and divinyl tetramethyldisiloxane.

Accordingly, in another aspect of the invention there is thus provided an emulsion release coating composition which comprises an emulsion composition as hereinabove described and a precious metal catalyst.

An emulsion release coating composition as set forth in the preceding paragraph may be formed by incorporating a precious metal catalyst in an emulsion composition according to the invention. The catalyst may be employed in an emulsion release coating composition according to the invention in proportions of from 40 to 120 ppm based on the combined weight of the reactive components i.e. those components having silicon-bonded alkenyl groups and those having silicon-bonded hydrogen atoms, within the emulsion composition.

If desired an emulsion release coating composition may be provided by mixing an emulsion composition according to the invention with a precious metal catalyst and a premium release composition comprising (A) an alkenyl functional polydiorganosiloxane and (B) a linear or cyclic polyorganohydrogensiloxane. Component (A) may be an alkenyl polydiorganosiloxane as referred to above, preferably a polydiorganosiloxane according to the general formula $R'R_2SiO(R_2SiO)_m(R'RSiO)_nSiR_2R'$ wherein R and R' are as referred to above and are preferably a methyl group and vinyl group respectively; m is from about 80 to 200 and n is from 0 to 5 such that the polydiorganosiloxane has a viscosity of about 100 to 650 mPa·s at 25° C. and a vinyl content of from 0.3 to 1.2% by weight.

The linear or cyclic polyorganohydrogensiloxane (B) may be a homopolymer or copolymer having 0.3 to 1.6 weight % of silicon-bonded hydrogen atoms per molecule. The most preferred component (B) is a copolymer according to the general formula $R_3SiO—(RHSiO)_q(R_2SiO)_pSiR_3$ wherein R is as hereinabove defined, q is from 1 to 50 and p is from 0 to 30. Component (B) may be present in an emulsion release coating composition in proportions of from 2 to 16 parts per 100 parts of component (A).

An emulsion release coating composition according to the invention may be applied to a variety of substrates and cured, for example by heating, to provide a thin adhesive surface coating or film. Emulsion release coating compositions are particularly suitable for use in the treatment of fibrous materials, for example paper, to provide release materials for use as protective backings for storing adhesive coated articles, e.g. labels and wall coverings, prior to their use.

The performance of a release coating may be expressed in terms of the force required to peel apart a laminate consisting of a substrate coated with a cured release coating composition and an adhesive coated article at a given delamination speed. Known compositions based on alkenyl and hydrogen bearing polysiloxanes may be used to provide cured release coatings which are easily peeled apart from an adhesive surface over a range of delamination speeds using comparatively small forces. Such compositions, referred to in the art as premium release compositions require so little force to effect delamination that separation of the coated surface from an adhesive surface is so readily achieved that delamination may occur accidentally, for example in storage or during handling.

The performance of a cured release coating resulting from an emulsion release coating composition according to the invention varies in relation to the type of adhesive used in coating an article. However, for a given adhesive the performance varies in accordance with the ratio of silicon-bonded hydrogen atoms to silicon-bonded alkenyl groups, and in accordance with the rate of SiH provided by the linear or cyclic polyorganohydrogensiloxane to SiH provided by the component (c).

Accordingly, in a preferred emulsion release coating composition according to the invention, the vinyl containing components (a) and (b) and the SiH containing components (c) and optionally (e) are combined in proportions which provide for at least 1.2 SiH groups per SiVi group and not more than 3.5 SiH groups per SiVi group, the preferred ratio of SiH:SiVi being 1.5:1 to 2.5:1 most preferably 2.0:1 to 2.5:1 and, where appropriate, the ratio of silicon-bonded H-atoms provided by component (e) to silicon-bonded H-atoms provided by the resin (c) is from 95:5 to 5:95 and is preferably 95:5 to 50:50.

In those preferred emulsion release coating compositions according to the invention which comprise a premium release composition as hereinbefore described, the proportions of the components (a), (b) and optionally (e) are as aforesaid, the total SiH:SiVi ratio is from 1.0:1 to 3.5:1, preferably 1.1:1 to 2.5:1 and the ratio of SiH provided by component (b) and optionally (e) to SiH provided by component (c) is from 99:1 to 5:95 and preferably 99:1 to 51:49.

If desired, in order to enable provision of various emulsion release coating compositions having selected proportions of the components, it is convenient to provide the emulsion release coating composition in two or more parts, one part comprising the components (A) and (B) in the desired ratio and another part comprising the components (a), (b), (c) and optionally (e) in the desired ratio. These parts may be mixed in selected proportions to provide an emulsion release coating composition exhibiting the required properties.

The emulsion composition may provide 100% of the active solids in an emulsion release coating composition according to the invention. Alternatively, the emulsion composition may be employed as a controlled release additive in an emulsion release coating composition according to the invention providing from about 1 to 99% of the total active solids in the release coating composition according to the invention.

The invention provides in another of its aspects the use of an emulsion composition according to the invention in conjunction with a precious metal catalyst as an emulsion release coating composition or as a controlled release additive component in an emulsion release coating composition.

The use of the emulsion composition in or as an emulsion release coating composition according to the invention has the effect of increasing the force required to delaminate a substrate, coated with a cured emulsion release coating composition, from an adhesive coated article. Furthermore, the increase may be achieved in a controlled and predictable fashion.

An emulsion release coating composition may be prepared according to the emulsification process described above.

Preferably an emulsion release coating composition according to the invention is formed from three parts. The first part is a premium release composition emulsion, preferably formed as a 30 to 50% and more preferably a 38 to 42% silicone solids emulsion. The second part is an emulsion composition as hereinabove described, preferably formed as a 30 to 50% and more preferably a 38 to 42% active solids emulsion. The third part is a precious metal catalyst emulsion component, comprising 100 parts by weight of an alkenyl polydiorganosiloxane (A) and 100 to 1000 parts per million based on component (A) of a platinum (II) complex.

The preferred emulsion release coating compositions according to the invention may be prepared by combining desired amounts of the three emulsion parts described above and mixing them to form a stable homogenous dispersion. Preferred emulsion release coating composition may be provided as 3 to 40% and preferably 3 to 20% active solids emulsion.

Accordingly, in another aspect of the invention there is provided a method of preparing an emulsion release coating composition comprising the steps of combining the desired amounts of a premium release composition emulsion, an emulsion composition as hereinabove described and a precious metal catalyst composition and mixing them to form a stable homogenous dispersion.

Emulsion release coating compositions according to the invention may be applied to substrates, for example cellulosic or fibrous substrates, by techniques known in the art, for example direct or offset gravure, air knife, bar coating or blade coating. For applications requiring continuous coating, for example paper coating, the coating is best applied by gravure, air knife or a bar coater. The thickness of the applied coating may be varied in a known manner, for example by the choice of gravure roll, air velocity and angle of attack of the air knife or mayer rod in the bar coater. A coat weight of 0.5 to 2.5 grams of composition per square meter of substrate surface is typically applied to suitable substrates. After application to a substrate the emulsion release coating composition may be cured by application of heat. Exposure of the coating to temperature of 90 to 200° C. for 2 to 15 seconds is normally sufficient to achieve a satisfactory cure.

Accordingly, there is provided in another aspect of the invention a method of coating a substrate comprising the steps of coating said substrate with an emulsion release coating composition and allowing the emulsion release coating to cure thereon.

The invention provides in another of its aspects the use of an emulsion release coating composition according to the invention applied to a suitable substrate and cured thereon to provide a release coating exhibiting efficient release from a range of strong adhesives.

In yet another aspect of the invention there is provided a substrate coated with an emulsion release coating composition as hereinabove described.

Cured release coatings derived from an emulsion release coating compositions according to the invention are notable for the relatively high release force needed to peel them away from adhesive coated articles. The release force of delamination may be accurately controlled i.e. increased or decreased incrementally by varying the proportions of components of the emulsion release coating composition.

The release force profile of a coating derived from an emulsion release coating composition according to the invention is substantially constant over a range of high delamination speeds from 20 to 250 meters per minute. This is desirable in industry where laminates are peeled away over a range of high speeds and constant performance of a release coating is required.

Release coatings formed by use of emulsion release coating compositions according to the invention have improved release stability over time. Thus, there is no significant difference in release force whether a laminate is peeled after one hour, one week or one month or more after its formation. This feature, combined with the improved control of the release force of the release coatings, enables an operator to predict the release force required to delaminate a coated article for a given adhesive.

Adhesives delaminated from a release coating formed by use of emulsion release coating compositions as hereinbefore described exhibit good subsequent adhesive strength (SAS). Where there is no loss of adhesive performance as a result of the adhesive being in intimate contact with the release coating the SAS would be regarded as 100%. Subsequent adhesive strength of greater than 90% is achievable when adhesive coated articles are delaminated from preferred emulsion release coatings derived from preferred emulsion release coating composition in which the SiH:SiVi ratio is from 1.2:1 to 3.5:1 and the ratio SiH provided by linear or cyclic polyorganohydrogensiloxanes (b) and optionally (e) to SiH provided by the SiH bearing silicone resin (c) is about at least 85:15.

In yet another aspect of the invention emulsion release coating compositions containing component (c) exhibited a reduced tendency to foam and have a static bath life of more than 24 hours when component (c) is present in amounts of up to 31 parts per 100 parts of component (a).

There now follows a description of example emulsion release coating compositions, some of which are illustrative of the invention. In these examples all parts and percentages are expressed by weight and viscosities are measured at 25° C.

EXAMPLE 1

A premium release emulsion composition was formed as follows:

38.2 parts by weight of a vinyl endblocked polydimethylsiloxane having a viscosity of 150 mPa·s and a vinyl content of 0.71% by weight and 1.9 parts of a SiH containing polyorganosiloxane having a viscosity of 85 mPa.s and 0.9 weight % of silicon-bonded hydrogen-atoms were mixed to form an oil phase.

The oil phase was blended with 20.0 parts of a 9.5% polyvinylacetate solution in water, 39.9 parts of water and 0.05 part of acetic acid to form a crude emulsion. The crude emulsion was homogenised using an HP-sonolator to provide an oil-in-water emulsion with a mean particle size of less than 1.0 mm. The oil-in-water emulsion was adjusted to 40% silicone solids before adding 0.1 part of 3,5-dimethyl-1-hexyne-3-ol as a bath-life extender.

An emulsion composition according to the invention, hereinafter referred to as a controlled release additive, was prepared as follows: 0.2 part of a silicone resin (c) bearing SiH groups having a viscosity of 2000 $mm^2s^{-1}$ and 0.8 weight % of silicon-bonded hydrogen atom, 25.0 parts of an alkenylated silicone resin (a) provided as a 60% solution in xylene having 2.0 weight % vinyl groups, based on resin solids, 4.2 parts of a linear or cyclic polyorganosiloxane (e) having a viscosity of 85 mPa.s and 0.9 weight % of silicon-bonded hydrogen atoms, 1.8 parts of an alkenyl polydiorganosiloxane (b) having a viscosity of 10,000 mPa.s and 0.1 weight % vinyl groups and 8.8 parts of 1-octadecene were mixed to form an oil phase composition.

The oil phase composition was blended with 20.00 parts of a 9.5% solution of polyvinylacetate in water, 0.05 part of acetic acid, and 39.9 parts of water to provide a crude emulsion.

The crude emulsion was homogenised to provide an emulsion with a mean particle size of less than 1.0 mm, 0.1 part of an acetylenic alcohol, 3,5-dimethyl-1-hexyne-3-ol was added and the emulsion adjusted to 40% active solids.

A catalyst emulsion composition was formed as follows:

3.2 parts of a platinum catalyst solution (Platinum catalyst solution consists of 94 parts of a vinyl end-blocked polydimethylsiloxane and 6 parts of a tetramethyldivinylsiloxane complex with platinum metal) was added to 36.8 parts of a vinyl end-blocked polydimethylsiloxane (b) having a viscosity of 450 mPa.s and 0.5 weight % of vinyl groups with mixing. After 15 minutes mixing was discontinued. 10.0 parts of 18.0% polyvinylacetate solution in water, 0.02 part of a silicone emulsion antifoam and 50.0 parts of water were added to the mixture and the resultant mixture stirred for a further 30 minutes. The crude emulsion so formed was homogenised to achieve the desired particle size (<1 mm) and distribution and the silicone solids adjusted to 40%.

The three emulsion parts described above were blended with water in the proportions shown in Table 1 (below) in order to form emulsion release coating compositions illustrative of the invention at 10% active solids. The emulsion release coating compositions were formulated in order that 0, 20, 40, 60 and 80% of the silicone solids originated from the controlled release additive formulation.

TABLE 1

Emulsion release coating composition formulations (at 10% active solids)

| | | PARTS BY WEIGHT | | |
|---|---|---|---|---|
| Bath | $H_2O$ | Premium Release Emulsion | Controlled Release Additive | Catalyst Emulsion |
| A | 75 | 22.5 | — | 2.5 |
| B | 75 | 17.5 | 5.0 | 2.5 |
| C | 75 | 12.5 | 10.0 | 2.5 |
| D | 75 | 7.5 | 15.0 | 2.5 |
| E | 75 | 2.5 | 20.0 | 2.5 |

The release performance of coatings from bath A to E are shown in Table 2 (below).

The test conditions were as follows:

The coating compositions described in Table 1 were coated onto a glassine paper substrate (Kammerer AV100) and cured at 1500 C for 30 seconds. The coat weight of the cured coating was 0.8g/m² dry silicone. The coated paper substrate was aged for 7 days at 230 C and 50% relative humidity prior to lamination.

Adhesive test tapes were cut into strips of 25 mm×200 mm and placed onto the coated substrate. To ensure intimate contact of the adhesive with the coated paper substrates a weighted roller was passed over the test strips.

The laminates were aged for 20 hours at 230 C±20 C and 50%±5% relative humidity.

Delamination of test strips was conducted at 300 mm/minute with a peel angle of 1800. The force required (g/25mm) to delaminate the adhesive strips from the coated paper was measured.

The test tapes used in the experiments were TESA® 7475, an acrylic adhesive, TESA® 7476, TESA® 4651 and TESA® 4154 which are rubber based adhesives.

TABLE 2

Emulsion Release Coating Composition Performance
Release (g/25 mm) at 300 mm/min

| Bath | %$^c$ | Controlled Release Additive SiH$^a$:SiH$^b$ | SiH:SiVi | TESA 7475 | TESA 7476 | TESA 4651 | TESA 4154 |
|---|---|---|---|---|---|---|---|
| A | 0 | — | — | 7 | 50 | 12 | 1.4 |
| B | 20 | 95:5 | 2.25 | 22 | 92 | 24 | 6.7 |
| C | 40 | 95:5 | 2.25 | 28 | 101 | 31 | 13.5 |
| D | 60 | 95:5 | 2.25 | 42 | 153 | 79 | 25.1 |
| E | 80 | 95:5 | 2.25 | 102 | 294 | 138 | 60.3 | a = SiH provided by the linear or cyclic polyorganohydrogensiloxane (e)
b = SiH present in SiH containing resin (c)
c = percentage of active solids in the emulsion release coating composition originating from the controlled release additive.

Comparison of the release force data of Bath A with Bath B to E at low delamination speed (300 mm/min) reveals that the test strips are delaminated with much higher release forces in compositions containing the controlled release additive than the compositions containing no controlled release additive (Bath A).

EXAMPLE 2 COMPARATIVE

Comparative coating compositions (F to I) were formed in the same way as the illustrative emulsion release coating compositions, however, the controlled release additive used was similar to the controlled release additive illustrative of the invention with the exception that it did not contain the silicone resin bearing SiH groups (c). Total SiH content in this controlled release additive composition was provided by the linear or cyclic polyorganohydrogensiloxane polysiloxane (e), the SiH:SiVi ratio of the controlled release additive composition remaining constant.

TABLE 3

Comparative Coating Composition Release Performance
Release (g/25 mm) at 300 mm/min

| Bath | %$^c$ | Controlled Release Additive SiH$^a$:SiH$^b$ | SiH:SiVi | TESA 7475 | TESA 7476 |
|---|---|---|---|---|---|
| A | 0 | — | — | 7 | 50 |
| F | 20 | 100:00 | 2.25:1 | 14 | 67 |
| G | 40 | 100:00 | 2.25:1 | 22 | 97 |
| H | 60 | 100:00 | 2.25:1 | 37 | 138 |
| I | 80 | 100:00 | 2.25:1 | 90 | 245 | a = SiH provided by in the linear or cyclic polyorganohydrogensiloxane (e)
b = SiH present in resin (c)
c = percentage of active solids in the coating composition originating from the controlled release additive.

The release force values are consistently lower than the values for the corresponding test tapes in Table 2. The use of component (c) in the controlled release additive composition significantly improves the efficiency of release force enhancement even at low addition levels of the controlled release additive.

EXAMPLE 3

This example reveals the effect of the controlled release additive as a function of delamination speed.

A coated paper substrate as prepared in Example 1 was aged for 28 days at 230 C/50% relative humidity prior to lamination with a solvent based rubber adhesive coated article. The laminate was aged for 16 hours at 600 C before delaminating at a peel angle of 1800 C. The results are shown in Table 4.

TABLE 4

Release force (g/50 mm) as a function of delamination speed
(Release g/50 mm)

| Bath | %c | Controlled Release Additive SiHa:SiHb | SiH:SiVi | 0.3 | 7.5 | 20 | 125 | 250 |
|---|---|---|---|---|---|---|---|---|
| A | — | — | — | 5 | 23 | 32 | 74 | 89 |
| B | 20 | 95:5 | 2.25:1 | 13 | 69 | 102 | 167 | 172 |
| C | 40 | 95:5 | 2.25:1 | 17 | 108 | 164 | 179 | 181 |
| D | 60 | 95:5 | 2.25:1 | 36 | 239 | 309 | 316 | 307 |
| E | 80 | 95:5 | 2.25:1 | 180 | 541 | 695 | 650 | 508 | a = SiH provided by the linear or cyclic polyorganohydrogensiloxane (e)
b = SiH present in resin (c)
c = percentage of active solids in the release coating composition originating from the controlled release additive.

The results shown in Table 4 demonstrate the significant release force enhancement over the whole range of delamination speeds. At the higher end of the range of delamination speeds release force does not increase substantially with speed.

EXAMPLE 4

In this example the effect of the ratio of SiH$^a$:SiH$^b$ on the release force was examined at low delamination speed (300 mm/min).

Release coating compositions for use in this example were prepared from premium and catalyst emulsions as used in Example 1 together with controlled release additives formed from the same materials as used in Example 1 and employing 24.5 parts of component (a) and 1.7 parts of component (b) as vinyl containing polymers, 9.8 parts of 1-octadecene, 3.6, 2.8 and 2.0 parts respectively of the linear or cyclic polydiorganohydrogensiloxane (e) and 0.4, 1.2 and 2.0 parts respectively of SiH containing resins (c) in proportions such that the SiH content in the controlled release additive was constant at 0.1% by weight and the SiH:SiVi ratio was 2:1. Thus a range of release coating compositions was formed with varying ratio of SiH$^a$:SiH$^b$ whilst keeping the SiH:SiVi ratio constant.

The coatings were aged for 4 weeks prior to lamination with test tapes. The laminates were aged for 20 hours at 230 C and 50% relative humidity before performing the delamination. The results are shown in Table 5.

TABLE 5

Release (g/25 mm)

| %$^c$ | Controlled Release Additive SiH$^a$:SiH$^b$ | SiH:SiVi | TESA 4154 | TESA 4651 | TESA 7475 | TESA 7476 |
|---|---|---|---|---|---|---|
| 0 | — | — | 3 | 24 | 10 | 33 |
| 20 | 90:10 | 2:1 | 3 | 34 | 12 | 54 |
| | 70:30 | 2:1 | 3 | 36 | 12 | 54 |
| | 50:50 | 2:1 | 3 | 38 | 11 | 55 |
| 50 | 90:10 | 2:1 | 16 | 72 | 22 | 105 |
| | 70:30 | 2:1 | 17 | 74 | 25 | 102 |
| | 50:50 | 2:1 | 20 | 85 | 30 | 112 |
| 80 | 90:10 | 2:1 | 102 | 190 | 128 | 373 |

TABLE 5-continued

Release (g/25 mm)

| %$^c$ | Controlled Release Additive SiH$^a$:SiH$^b$ | SiH:SiVi | TESA 4154 | TESA 4651 | TESA 7475 | TESA 7476 |
|---|---|---|---|---|---|---|
| | 70:30 | 2:1 | 133 | 232 | 165 | 477 |
| | 50:50 | 2:1 | 154 | 262 | 191 | 540 | a = SiH provided by the linear or cyclic polyorganohydrogensiloxane (e)
b = SiH present in SiH containing silicone resin (c)
c = percentage of active solids in the release coating composition originating from the controlled release additive.

Decreasing the ratio of SiH$^a$:SiH$^b$ improves the efficiency of release force enhancement of coatings formed from release coating compositions.

EXAMPLE 5

This example examines the effect of varying the SiH:SiVi ratio in the controlled release additive composition upon the release force at low delamination speed (300 mm/min).

Emulsion release coating compositions for use in this example were prepared from premium and catalyst emulsions as used in Example 1 together with controlled release additives formed from the same materials as used in Example 1. The controlled release additives consisted of 24.5 parts of component (a), 1.7 parts of component (b) 3.0, 4.0 or 5.0 parts respectively of SiH containing components ((e) and (c), ratio of (e):(c) 90:10) such that the SiH:SiVi ratio in the controlled release additive of the emulsion release coating composition was correspondingly 1.5:1, 2.0:1 and 2.5:1. 1-octadecene was present in each composition in amounts to provide the emulsion release coating compositions as 40% active solids. The results are shown in Table 6.

TABLE 6

Release force (g/25 mm). Effect of SiH:SiVi in Controlled Release Additive

| Adhesive | SiH:SiVi | SiH$^a$:SiH$^b$ | %$^c$ Controlled Release Additive | | | |
|---|---|---|---|---|---|---|
| | | | 0 | 20 | 50 | 80 |
| TESA 4651 | 1.5:1 | 90:10 | 24 | 37 | 68 | 253 |
| | 2.0:1 | 90:10 | 24 | 34 | 65 | 190 |
| | 2.5:1 | 90:10 | 24 | 31 | 63 | 160 |
| TESA 7475 | 1.5:1 | 90:10 | 10 | 16 | 25 | 203 |
| | 2.0:1 | 90:10 | 10 | 12 | 22 | 128 |
| | 2.5:1 | 90:10 | 10 | 10 | 23 | 78 | a = SiH provided by the linear or cyclic polyorganohydrogensiloxane (e)
b = SiH present in SiH containing silicone resin (c)
c = percentage of active solids in the release coating composition originating from the controlled release additive.

It is clear from the data in Table 6 that the efficiency of release force enhancement of coatings is reduced as the ratio of SiH:SiVi in the controlled release additive is increased.

EXAMPLE 6

Emulsion release coating compositions and coated paper substrates were prepared according to the method of Example 1. Delamination tests were carried out at 300 mm/min and 1800 peel angle for laminates prepared immediately, 1 week and 4 weeks after preparation of the coated substrate. The laminates were stored prior to delamination for 20 hours/230 C and 50% RH. The results are shown in Table 7.

TABLE 7

Release force (g/25 mm) as a function of laminate age

| Test Tape | AGE (Weeks) | %$^c$ Controlled Release Additive | | | | |
|---|---|---|---|---|---|---|
| | | 0 | 20 | 40 | 60 | 80 |
| TESA 4154 | 0 | 1.5 | 5.7 | 15.9 | 22.8 | 54.9 |
| | 1 | 1.4 | 6.7 | 13.5 | 25.1 | 60.3 |
| | 4 | 1.7 | 11.4 | 16.3 | 25.4 | 56.9 |
| TESA 4651 | 0 | 13 | 24 | 37 | 81 | 124 |
| | 1 | 12 | 24 | 31 | 79 | 138 |
| | 4 | 14 | 25 | 34 | 81 | 132 |
| TESA 7476 | 0 | 45 | 69 | 109 | 168 | 250 |
| | 1 | 50 | 92 | 101 | 153 | 294 |
| | 4 | 53 | 89 | 129 | 158 | 284 |
| TESA 7475 | 0 | 11 | 30 | 40 | 109 | 127 |
| | 1 | 7 | 22 | 28 | 42 | 102 |
| | 4 | 6 | 20 | 28 | 45 | 98 | c = percentage of active solids in the release coating composition originating from the controlled release additive The data in Table 7 shows the performance of the coatings is stable with time.

EXAMPLE 7

This example illustrates the subsequent adhesive strength (SAS) of test strips as a function of the controlled release additive formulation. The test conditions were as follows:

Emulsion release coating compositions for use in this example were prepared from premium and catalyst emulsions as used in Example 1 together with controlled release additive formed from the same materials in Example 1. Formulations 1 and 2 consisted of 24.0 parts (a), 4.9 parts (b) and 3.1 parts of the total SiH containing materials (e) and (c) present in the mixture in proportions such that the ratio of SiH (e): SiH (c) was 90:10 and 50:50 respectively. Formulations 3 and 4 consisted of 25.0 parts (a), 1.8 parts (c) and 1.7 parts of the total SiH containing materials (e) and (c) present in the mixture in proportions such that the ratio of SiH of component (e): SiH of component (c) was 90:10 and 50:50 respectively. In all compositions 1-octadecene was present in proportions to provide compositions as 40% active solids.

Test strips delaminated from paper substrates coated with coating compositions described above were placed onto a polyester film. A weighted roller was passed over the test strips to obtain intimate contact with the test plate. The test strips were left for 60 minutes before being pulled away from the polyester film at 300 mm/min at a peel angle of 1800 C.

Readings were taken of the release force periodically during removal of the test strips. The average reading was calculated for each strip tested. The release force obtained was compared with a control strip, the control strip was taken to have a SAS of 100%. The results are presented in Table 8.

TABLE 8

| | | Subsequent adhesive strength (%) Controlled Release Additive Formulation | | | | |
|---|---|---|---|---|---|---|
| | | | %$^c$ CRA | | | |
| Bath | SiH:SiVi | SiH$^a$:SiH$^b$ | 0 | 20 | 50 | 80 |
| 1 | 2.5:1 | 90:10 | 78 | 88 | 90 | 91 |
| 2 | 2.5:1 | 50:50 | 78 | 92 | 88 | 75 |
| 3 | 1.5:1 | 90:10 | 78 | 78 | 74 | 71 |
| 4 | 1.5:1 | 50:50 | 78 | 74 | 73 | 60 | a = SiH provided by the linear or cyclic polyorganohydrogensiloxane (e)
b = SiH provided by the SiH containing silicone resin (c)
c = percentage of active solids in the coating composition originating from the controlled release additive.

The results in Table 8 show that for compositions with high active solids provided by the controlled release additives the SAS increases as the ratio of silicon-bonded hydrogen atoms provided by component (e) to silicon-bonded hydrogen atoms provided by component (c) increases.

That which is claimed is:

1. A coated substrate obtained by a method comprising:
   (I) applying a silicone emulsion composition to the surface of a substrate wherein the silicone emulsion composition comprises:
   (a) an alkenylated silicone resin;
   (b) an alkenyl polydiorganosiloxane;
   (c) a silicone resin having SiH groups;
   (d) water;
   (e) a polyorganohydrogensiloxane selected from the group consisting of linear polyorganohydrogensiloxanes and cyclic polyorganohydrogensiloxanes;
   (f) an unsaturated organic monomer selected from the group consisting of dibutylmaleate, decylvinylether, dodecylvinylether, camphene, meta-bis-isopropenyl benzene, and $C_{16-18}$ alpha-olefins;
   (g) a hydrosilylation catalyst; and
   (h) an emulsifying agent selected from the group consisting of anionic emulsifying agents, nonionic emulsifying agents, and cationic emulsifying agents.

2. A coated substrate according to claim 1, wherein the method further comprises (II) exposing the product of (I) to heat in an amount sufficient to cure the silicone emulsion composition.

3. A coated substrate according to claim 1, wherein the method further comprises (II) applying an adhesive to the product of (I).

4. A coated substrate according to claim 2, wherein the method further comprises (III) applying an adhesive to the product of (II).

5. A coated substrate according to claim 1, wherein (a) is a resin consisting essentially of M units $R'R_2SiO_{1/2}$ and $R_3SiO_{1/2}$, and Q units $SiO_{4/2}$, wherein R denotes an alkyl or aryl group having 1 to 8 carbon atoms, and R' is vinyl, allyl, hexenyl, or cyclohexenyl and wherein the ratio of M units to Q units is from 0.4:1 to 1.7:1.

6. A coated substrate according to claim 1, wherein (b) is an alkenyl polydiorganosiloxane consisting essentially of units having the formula $R_aR'SiO_{(3-a/2)}$ and $R_bSiO_{(4-b/2)}$ wherein R denotes an alkyl or aryl group having 1 to 8 carbon atoms, R' is vinyl, allyl, hexenyl, or cyclohexenyl, a has a value of 1 or 2 and b has a value of 2 or 3.

7. A coated substrate according to claim 1, wherein (b) is polydiorganosiloxane consisting of $Me_2SiO$ units and terminal $ViMe_2SiO_{1/2}$ units and having a viscosity of from 7000 mPaxs to 12000 mPaxs wherein Me denotes methyl and Vi denotes vinyl.

8. A coated substrate according to claim 1, wherein (c) is an MQ resin consisting essentially of the units $R_3SiO_{1/2}$, $R_2R'''SiO_{1/2}$, and $SiO_{4/2}$ wherein R is selected from the group consisting of alkyl groups having 1 to 8 carbon atoms and R''' is selected from the group consisting of a polyorganohydrogensiloxy group and a hydrogen atom.

9. A coated substrate according to claim 1, wherein (c) is a silicone resin having from 0.6% to 1.0% by weight of silicon-bonded hydrogen atoms per molecule.

10. A coated substrate according to claim 1, wherein (f) is selected from the group consisting of decylvinylether, dodecylvinylether, and $C_{16}$–$C_{18}$ alpha-olefins.

11. A coated substrate according to claim 1, wherein (g) is selected from the group consisting of platinum catalysts and platinum complexes.

12. A coated substrate according to claim 1, wherein (h) is a nonionic emulsifying agent.

13. A coated substrate according to claim 12, wherein the nonionic emulsifying agent is polyvinyl acetate.

14. A coated substrate according to claim 1, wherein the silicone emulsion composition further comprises at least one ingredient selected from the group consisting of a bath life extender, a biocide, and acetic acid.

15. A coated substrate obtained by a method comprising:
    (I) applying a silicone emulsion composition to the surface of a substrate wherein the silicone emulsion composition is obtained by a method comprising mixing:
    (a) an alkenylated silicone resin;
    (b) an alkenyl polydiorganosiloxane;
    (c) a silicone resin having SiH groups;
    (d) water;
    (e) a polyorganohydrogensiloxane selected from the group consisting of linear polyorganohydrogensiloxanes and cyclic polyorganohydrogensiloxanes;
    (f) an unsaturated organic monomer selected from the group consisting of dibutylmaleate, decylvinylether, dodecylvinylether, camphene, meta-bis-isopropenyl benzene, and $C_{16-18}$ alpha-olefins;
    (g) a hydrosilylation catalyst; and
    (h) an emulsifying agent selected from the group consisting of anionic emulsifying agents, nonionic emulsifying agents, and cationic emulsifying agents.

16. A coated substrate according to claim 15, wherein the method further comprises (II) exposing the product of (I) to heat in an amount sufficient to cure the silicone emulsion composition.

17. A coated substrate according to claim 16 wherein the method further comprises (III) applying an adhesive to the product of (II).

* * * * *